United States Patent
Suzuki

(10) Patent No.: US 11,117,616 B2
(45) Date of Patent: Sep. 14, 2021

(54) LANE MAINTAINING ASSISTANCE DEVICE AND LANE MAINTAINING ASSISTANCE METHOD

(71) Applicant: ISUZU MOTORS LIMITED, Tokyo (JP)

(72) Inventor: Teruhiko Suzuki, Ayase (JP)

(73) Assignee: ISUZU MOTORS LIMITED, Tokyo (JP)

(*) Notice: Subject to any disclaimer, the term of this patent is extended or adjusted under 35 U.S.C. 154(b) by 181 days.

(21) Appl. No.: 16/322,667

(22) PCT Filed: Jul. 27, 2017

(86) PCT No.: PCT/JP2017/027252
§ 371 (c)(1),
(2) Date: Feb. 1, 2019

(87) PCT Pub. No.: WO2018/025745
PCT Pub. Date: Feb. 8, 2018

(65) Prior Publication Data
US 2020/0180693 A1 Jun. 11, 2020

(30) Foreign Application Priority Data
Aug. 2, 2016 (JP) .............................. JP2016-152051

(51) Int. Cl.
*B62D 15/02* (2006.01)
*B60R 11/04* (2006.01)
(Continued)

(52) U.S. Cl.
CPC ............ *B62D 15/025* (2013.01); *B60R 11/04* (2013.01); *B60W 10/20* (2013.01); *B60W 30/12* (2013.01);
(Continued)

(58) Field of Classification Search
CPC . B62D 15/025; B60R 11/04; B60R 2300/804; B60W 10/20; B60W 30/12;
(Continued)

(56) References Cited

U.S. PATENT DOCUMENTS 6,050,359 A     4/2000  Mouri et al.
6,422,582 B1 *  7/2002  Howard .................... B62D 6/04
                                                        280/90

(Continued)

FOREIGN PATENT DOCUMENTS

CN    1616289 A    5/2005
CN    109562781 A  4/2019
(Continued)

OTHER PUBLICATIONS

Machine traslation for JP-2006213094-A.*
(Continued)

*Primary Examiner* — Tyler J Lee
*Assistant Examiner* — Yufeng Zhang
(74) *Attorney, Agent, or Firm* — Procopio, Cory, Hargreaves & Savitch LLP

(57) ABSTRACT

A lane maintaining assistance device 1 is provided with the following: a first assistance unit that performs steering assistance of a vehicle by hydraulic pressure; a second assistance unit that performs steering assistance of the vehicle using a motor; and a steering assistance control unit 83 that reduces the steering assistance amount of the first assistance unit and starts steering assistance by the second assistance unit if the vehicle is determined to have entered a curve on the basis of a captured image in which a portion of the lane which is forward in the vehicle advancing-direction is captured.

11 Claims, 4 Drawing Sheets

(51) Int. Cl.
*B60W 10/20* (2006.01)
*B60W 30/12* (2020.01)
*B60W 40/072* (2012.01)
*G06K 9/00* (2006.01)

(52) U.S. Cl.
CPC ....... *B60W 40/072* (2013.01); *G06K 9/00798* (2013.01); *B60R 2300/804* (2013.01); *B60T 2201/087* (2013.01); *B60W 2510/207* (2013.01); *B60W 2540/18* (2013.01); *B60W 2552/30* (2020.02)

(58) Field of Classification Search
CPC ........... B60W 40/072; B60W 2552/30; B60W 2510/207; B60W 2540/18; G06K 9/00798; B60T 2201/087
See application file for complete search history.

(56) References Cited

U.S. PATENT DOCUMENTS

| | | | |
|---|---|---|---|
| 2005/0107931 A1 | 5/2005 | Shimakage et al. | |
| 2010/0004821 A1* | 1/2010 | Buerkle | B62D 15/025 701/41 |
| 2014/0218526 A1* | 8/2014 | Feid | G06K 9/00798 348/148 |
| 2019/0256140 A1 | 8/2019 | Suzuki | |

FOREIGN PATENT DOCUMENTS

| | | |
|---|---|---|
| EP | 1508494 A2 | 2/2005 |
| EP | 3492347 A1 | 6/2019 |
| JP | 2006-213094 A | 8/2006 |
| JP | 2009-513428 A | 4/2009 |
| JP | 2010-120504 A | 6/2010 |
| JP | 2014-118025 A | 6/2014 |

OTHER PUBLICATIONS

Machine traslation for JP-2014118025-A.*
Machine traslation for JP-2010120504-A.*
International Search Report and Written Opinion for related International Application No. PCT/JP2017/027252 dated Oct. 10, 2017; English translation of ISR provided; 6 pages.
Extended European Search Report for EP Application No. 17836851.0, dated Jul. 2, 2019, 9 pages.
Office Action for related CN App. No. 201780047896.0 dated Nov. 2, 2020. English translation provided; 13 pages.

* cited by examiner

[FIG. 1]
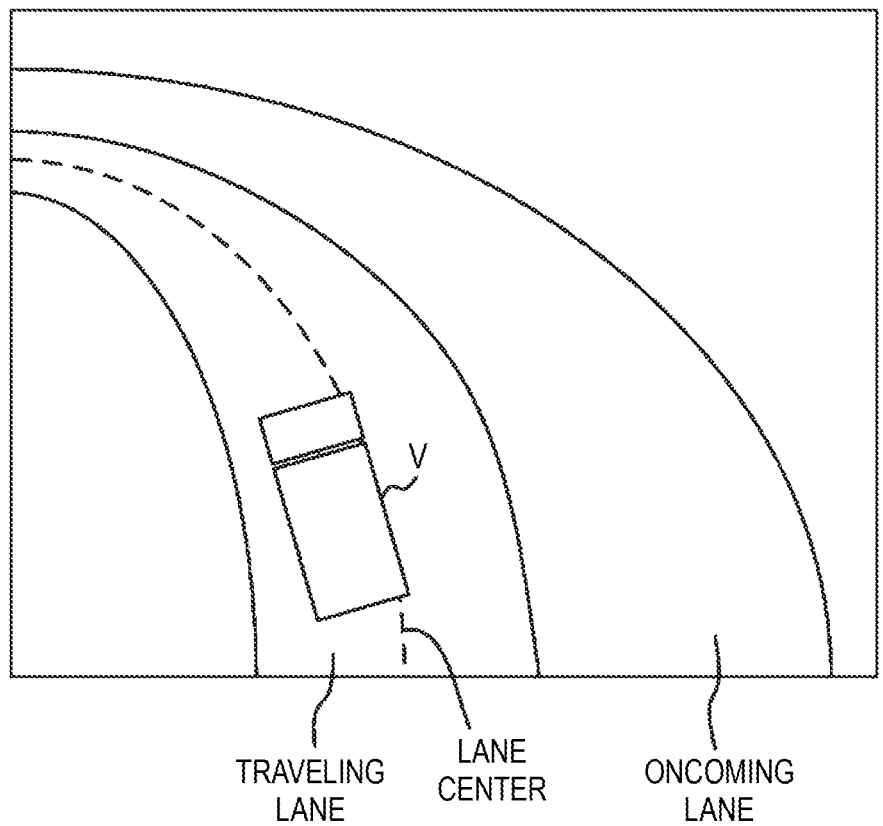

[FIG. 2]
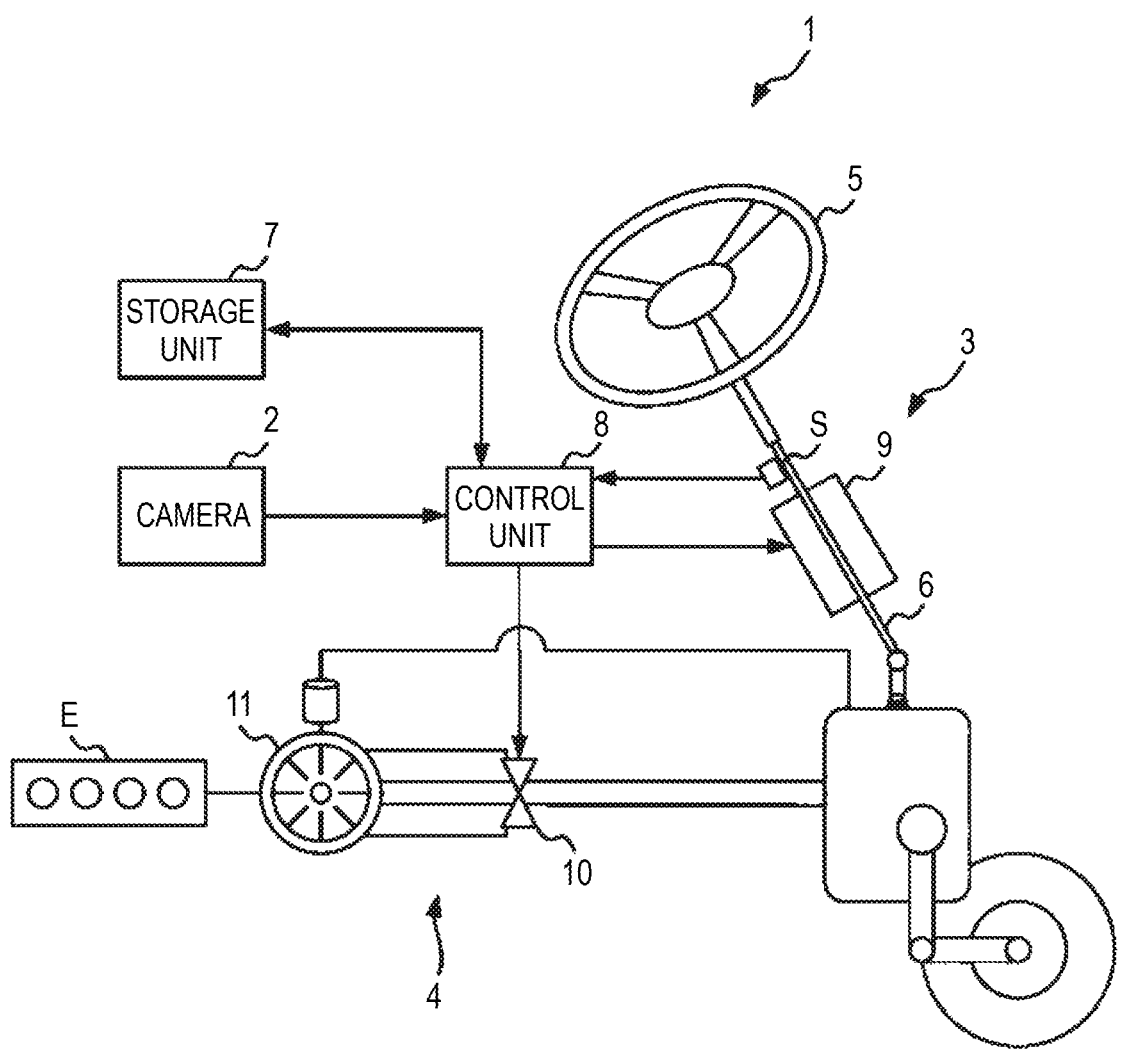

[FIG. 3]
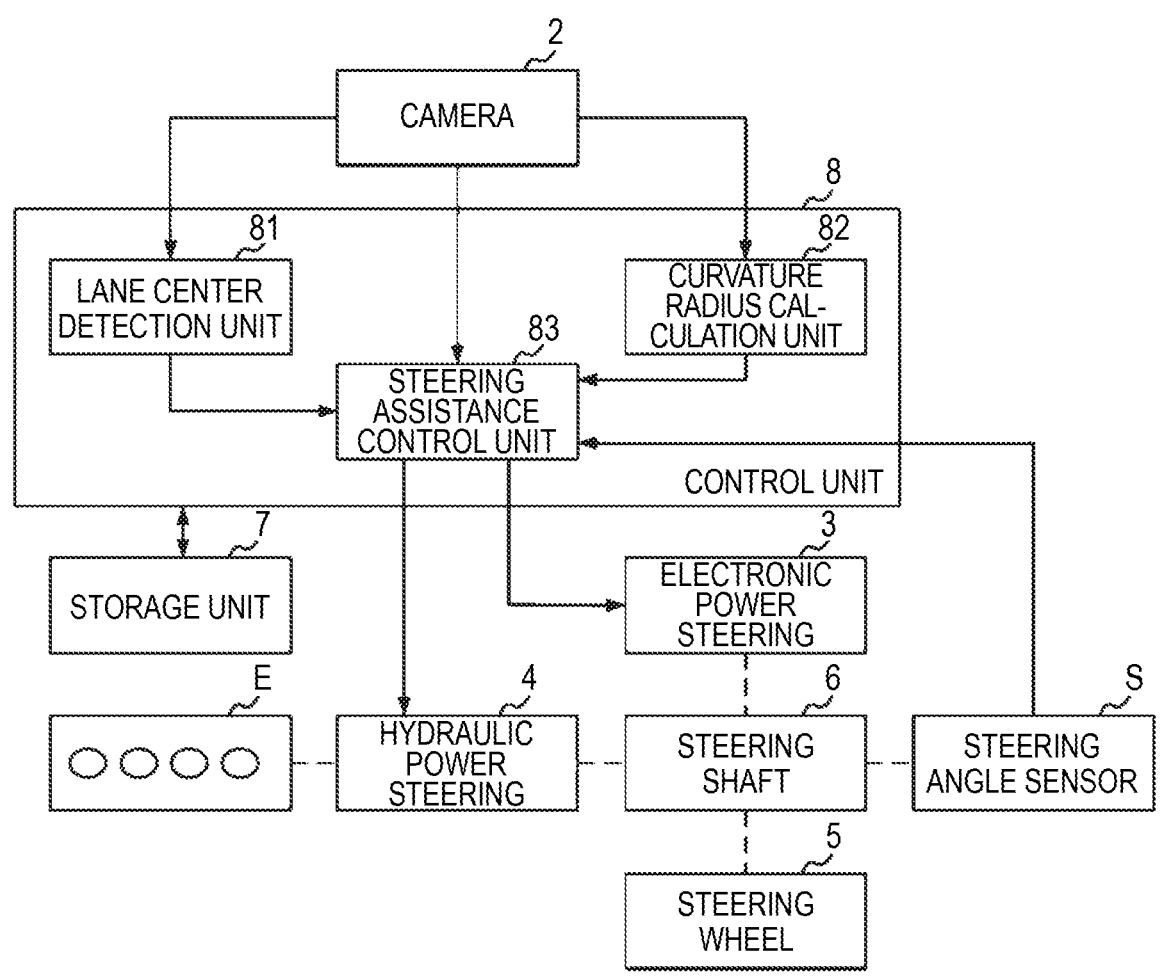

[FIG. 4]
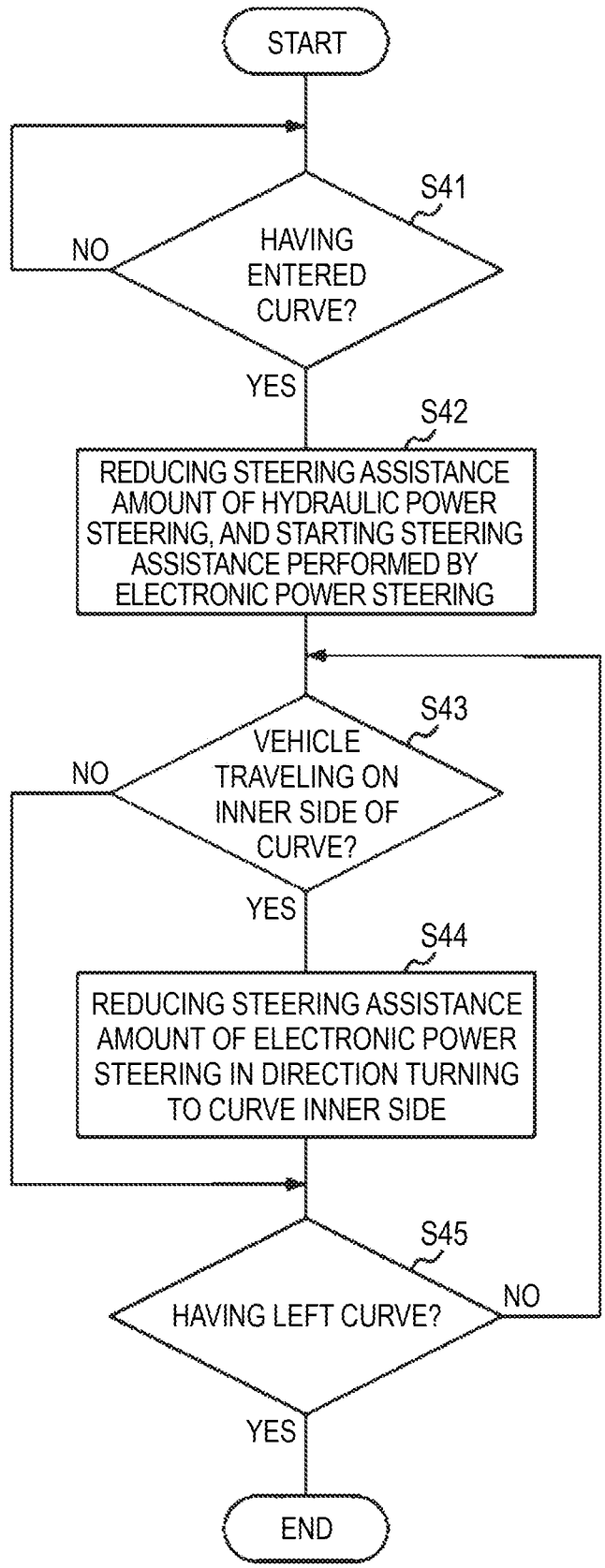

LANE MAINTAINING ASSISTANCE DEVICE AND LANE MAINTAINING ASSISTANCE METHOD

CROSS-REFERENCE TO RELATED APPLICATIONS

This application is a U.S. National Stage entry of PCT Application No: PCT/JP2017/027252 filed on Jul. 27, 2017, which claims priority to Japanese Patent Application No. 2016-152051 filed on Aug. 2, 2016, the contents of which are incorporated herein by reference.

TECHNICAL FIELD

The present disclosure relates to a lane maintaining assistance device and a lane maintaining assistance method for steering assistance using a hydraulic pressure and a motor in combination.

BACKGROUND ART

There is a technique in which a lane maintaining assistance torque is applied in a direction preventing a host vehicle from deviating from a traveling lane. PTL 1 discloses a technique in which, when traveling on a curve, a lane maintaining assistance torque in a direction toward a curve outer side is set larger than a lane maintaining assistance torque in a direction toward a curve inner side.

CITATION LIST

Patent Literature

PTL 1: JP-A-2014-118025

SUMMARY OF INVENTION

Technical Problem

Incidentally, when a vehicle is traveling on a curve, a driver needs to rotate a steering wheel in a direction of the curve inner side in order to go round the curve, while the need to rotate the steering wheel in a direction of the outer side of the curve is lower. Therefore, in order to effectively prevent the vehicle from deviating from the lane when traveling on the curve, control for preventing the steering wheel from being excessively rotated to the curve inner side is required.

However, in a case where a lane maintaining assistance device performs steering assistance by using only hydraulic power steering, different from a case where steering assistance is performed by using electronic power steering, it is difficult to change an assistance force of steering assistance between a case where the steering wheel is turned to the left and a case where the steering wheel is turned to the right. Therefore, in the case of a vehicle in which only hydraulic power steering is adopted to a lane maintaining assistance device, when application of a torque in the direction turning to the curve inner side is reduced so as not to excessively rotate the steering wheel to the curve inner side, there is a problem that it becomes difficult to return the vehicle to a center of the lane.

In view of the foregoing, an object of the present disclosure is to provide a technique of reducing application of a torque in a direction turning to an inner side of a curve while maintaining a torque applied in a direction turning to an outer side of the curve in a vehicle on which a hydraulic power steering is mounted.

Solution to Problem

According to a first aspect of the present disclosure, there may be provided a lane maintaining assistance device including: a first assistance unit configured to perform steering assistance of a vehicle by a hydraulic pressure; a second assistance unit configured to perform steering assistance of the vehicle by a motor; and a steering assistance control unit configured to, in a case where the vehicle is determined to have entered a curve on the basis of a captured image in which a lane forward in a vehicle advancing-direction is captured, reduce a steering assistance amount of the first assistance unit and start steering assistance by the second assistance unit.

The lane maintaining assistance device may further include a lane center detection unit configured to detect a center of the lane from the captured image, wherein the steering assistance control unit may be configured to, in a case where a center of the vehicle is determined to be traveling on an inner side of curve than the center of the lane, reduce the steering assistance amount of the second assistance unit as compared to a case where the center of the vehicle is determined to be traveling on an outer side of the curve than the center of the lane.

The steering assistance control unit may be configured to reduce the steering assistance amount of the second assistance unit as the center of the vehicle is closer to the inner side of the curve than the center of the lane.

The lane maintaining assistance device may further include a curvature radius calculation unit configured to calculate a curvature radius of the curve from the captured image, wherein the steering assistance control unit may be configured to reduce the steering assistance amount of the second assistance unit as the curvature radius of the curve is smaller.

The lane maintaining assistance device may further include a steering angle sensor attached to a steering shaft of a steering wheel, the steering angle sensor being configured to detect a rotation angle of the steering shaft, wherein the steering assistance control unit may be configured to: determine whether the steering wheel is rotated in a direction turning to the inner side of the curve or is rotated in a direction turning to the outer side of curve on the basis of the rotation angle of the steering shaft acquired from the steering angle sensor and the captured image; in a case where the steering wheel is rotated in the direction turning to the outer side of curve, maintain the steering assistance amount of the second assistance unit; and in a case where the steering wheel is rotated in the direction turning to the inner side of the curve, reduce the steering assistance amount of the second assistance unit.

The steering assistance control unit may be configured to: in a case where the vehicle is determined to have entered the curve, control the first assistance unit so as to apply a first steering assistance amount to the steering shaft; in a case where the vehicle is determined to have entered the curve, control the first assistance unit to apply a second steering assistance amount smaller than the first steering assistance amount to the steering shaft; and control the second assistance unit to apply a third steering assistance amount smaller than the second steering assistance amount to the steering shaft; and in a case where the vehicle is determined to be traveling on the inner side of the curve and the steering wheel is determined to be rotated in the direction turning to the inner side of the curve, reduce the third steering assistance amount such that a sum of the second steering assistance amount and the third steering assistance amount is smaller than the first steering assistance amount.

According to a second aspect of the present disclosure, there may be provided a lane maintaining assistance method for a vehicle including a processor, the method causing the processor to perform: performing steering assistance of the vehicle by a hydraulic pressure; and in a case where the vehicle is determined to have entered a curve on the basis of a captured image in which a lane forward in a vehicle advancing-direction is captured, reducing a steering assistance amount of the hydraulic pressure and starting steering assistance performed by a motor.

Advantageous Effects of Invention

According to the present disclosure, it is possible to reduce application of a torque in a direction turning to an inner side of a curve while maintaining a torque applied in a direction turning to an outer side of the curve in a vehicle equipped with hydraulic power steering.

BRIEF DESCRIPTION OF DRAWINGS

FIG. 1 is a diagram showing a state in which a vehicle is traveling on a curve.

FIG. 2 is a diagram showing a configuration of a lane maintaining assistance device.

FIG. 3 is a configuration diagram showing a flow of signals in the lane maintaining assistance device.

FIG. 4 is a flowchart of a processing performed by the lane maintaining assistance device.

DESCRIPTION OF EMBODIMENTS

Summary

Hereinafter, a summary of a lane maintaining assistance device according to an embodiment will be described with reference to FIG. 1.

FIG. 1 is a diagram showing a state in which a vehicle V is traveling on a curve. In FIG. 1, a road including a traveling lane on which the vehicle V travels and an oncoming lane is drawn. On the traveling lane, a lane center, which can be identified from a captured image obtained by imaging a traveling lane by imaging the traveling lane with the lane maintaining assistance device according to the embodiment, is indicated by a dotted line. The vehicle V is, for example, a large-sized vehicle whose steering wheel is difficult to operate without using hydraulic power steering.

When the vehicle V travels on the curve, a driver of the vehicle V rotates the steering wheel in a direction on a curve inner side. At this time, when a steering shaft is fully applied with a torque by the lane maintaining assistance device, the driver of the vehicle V may rotate the steering wheel excessively, and the vehicle V may deviate from a lane line on the curve inner side.

The lane maintaining assistance device according to the embodiment includes both a hydraulic power steering and an electronic power steering. The lane maintaining assistance device captures a front side in an advancing-direction of the vehicle, and uses the hydraulic power steering and the electronic power steering in combination when the vehicle V is determined to have entered the curve from the captured image. Specifically, the lane maintaining assistance device reduces the assistance force of the steering assistance performed by a hydraulic power steering system as compared to a case where the vehicle V travels on a straight lane, and compensates the reduced assistance force with steering assistance performed by the electronic power steering.

The lane maintaining assistance device reduces the assistance force of the steering assistance performed by the electronic power steering in a case where the vehicle V is determined to be on the curve inner side than the lane center from the captured image as compared to a case where the vehicle V is on a curve outer side than the lane center. This increases the steering force of the steering wheel in the direction toward the inner side of the curve. In this way, the lane maintaining assistance device can prevent the driver of the vehicle V from rotating the steering wheel excessively, so as to prevent the vehicle V from deviating from the lane line on the curve inner side.

In the present specification, the term "inner side of the curve" means the left side from the lane center when the curve turns to the left, and means the right side from the lane center when the curve turns to the right. The term "outer side of the curve" refers to a side opposite to the curve inner side when viewed from the lane center. The hydraulic power steering is also referred to as a first assistance unit, and the electronic power steering is also referred to as a second assistance unit. Hereinafter, the configuration of the lane maintaining assistance device will be described with reference to the drawings.

[Configuration of Lane Maintaining Assistance Device]

FIG. 2 is a diagram showing a configuration of a lane maintaining assistance device 1. The lane maintaining assistance device 1 includes a steering angle sensor S, a camera 2, an electronic power steering 3, a hydraulic power steering 4, a steering wheel 5, a steering shaft 6, a storage unit 7, a control unit 8, and an engine E. The steering wheel 5 is connected to the steering shaft 6, and is applied with a torque from the electronic power steering 3 and the hydraulic power steering 4 via the steering shaft 6.

The steering angle sensor S is attached to the steering shaft 6 to detect a rotation angle of the steering shaft. The control unit 8 acquires the rotation angle of the steering shaft 6 from the steering angle sensor S, and determines whether the steering wheel 5 is rotated clockwise or counterclockwise.

The camera 2 is connected to the control unit 8 in a wireless or wired manner, captures an image of the front side in the advancing-direction of the vehicle V, and sends the captured image to the control unit 8. The control unit 8 determines whether the steering wheel 5 is rotated in a direction turning to the curve inner side or is rotated in a direction turning to the curve outer side on the basis of the rotation angle of the steering shaft 6 acquired from the steering angle sensor S and the captured image.

The electronic power steering 3 includes a motor 9 connected to the control unit 8 in a wired or wireless manner. The motor 9 applies a torque to the steering shaft 6 based on a control signal sent from the control unit 8. That is, the electronic power steering 3 performs steering assistance of the vehicle V by the motor 9.

The motor 9 can apply torques having different magnitudes to the steering shaft 6 in a direction in which the steering shaft 6 rotates clockwise and in a direction in which the steering shaft 6 rotates counterclockwise. Therefore, when the vehicle V on which the electronic power steering 3 is mounted is traveling on the inner side of the curve, the steering wheel 5 can be rotated in the direction toward the outer side of the curve more easily than in the direction toward the inner side of the curve under the instruction of the control unit 8.

The hydraulic power steering 4 includes a variable displacement pump 11 connected to an electromagnetic valve 10. The variable displacement pump 11 is connected to the engine E and obtains power from the engine E. The electromagnetic valve 10 is connected to the control unit 8 in a wired or wireless manner, and has a degree of opening/closing adjusted on the basis of a control signal sent from the control unit 8. The hydraulic power steering 4 pumps a hydraulic oil through a piping by adjusting the degree of opening/closing of the electromagnetic valve 10, so as to apply a torque to the steering shaft 6. That is, the hydraulic power steering 4 performs steering assistance of the vehicle V by a hydraulic pressure.

The storage unit 7 includes a Read Only Memory (ROM) in which a program executed by the control unit 8 is recorded and a Random Access Memory (RAM) for temporarily recording data. For example, a curvature of the curve calculated by the control unit 8 is recorded in the RAM.

The control unit 8 also functions as a lane center detection unit 81, a curvature radius calculation unit 82, and a steering assistance control unit 83 by executing the program stored in the storage unit 7. Each function of the control unit 8 will be described below with reference to FIG. 3.

FIG. 3 is a configuration diagram showing a flow of signals in the lane maintaining assistance device 1. In FIG. 3, solid lines indicate the flow of the signals and dashed lines indicate electrical or mechanical connections.

The lane center detection unit 81 detects the center of the lane on which the vehicle V is traveling in the captured image. Specifically, the lane center detection unit 81 detects as the center of the lane, for example, center pixels or the vicinity of the center pixels in lines of pixels connecting one lane line and another lane line appearing in the captured image. The lane center detection unit 81 records the detected center of the lane in the storage unit 7 and notifies the steering assistance control unit 83 of the center.

The curvature radius calculation unit 82 calculates the curvature radius of the curve on the basis of the captured image using, for example, a known technique. The curvature radius calculation unit 82 records the calculated curvature radius of the curve in the storage unit 7 and notifies the steering assistance control unit 83 of the curvature radius.

The steering assistance control unit 83 acquires the captured image in which the lane forward in the advancing-direction of the vehicle V is captured from the camera 2, and reduces the assistance amount of the steering assistance performed by the hydraulic power steering 4 and starts the steering assistance performed by the electronic power steering 3 when the vehicle V is determined to have entered the curve on the basis of the captured image. For example, the steering assistance control unit 83 detects that the lane line is a curve on the basis of a change in distances from a center line of the captured image to the lane line, and determines that the vehicle V has entered a curve.

Specifically, when the vehicle V enters the curve, the steering assistance control unit 83 reduces the assistance amount of the steering assistance performed by the hydraulic power steering 4 to about 80% of the assistance amount when the vehicle V is traveling on a straight lane, and compensates the reduced assistance amount with the electronic power steering 3. The steering assistance control unit 83 adjusts the assistance amount of the steering assistance performed by the electronic power steering 3 while maintaining the assistance amount of the steering assistance performed by the hydraulic power steering 4 at about 80%. In other words, when the assistance amount of the steering assistance performed by the hydraulic power steering 4 when the vehicle V travels in a straight lane is defined as AFO1, the assistance amount of the steering assistance performed by the hydraulic power steering 4 when the vehicle V enters the curve is defined as AFO2, and the assistance amount of the steering assistance performed by the electronic power steering 3 when the vehicle V enters the curve is defined as AFE, the steering assistance control unit 83 adjusts the assistance amount of the steering assistance such that AFO2 is smaller than AFO1 and AFE is smaller than AFO2. The steering assistance control unit 83 is also capable of adjusting the assistance amount of the steering assistance such that a total of AFO2 and AFE is smaller than AFO1. Therefore, the driver of the vehicle V feels a load during operation of the steering wheel 5 when the steering assistance performed by the electronic power steering 3 is reduced.

The steering assistance control unit 83 reduces the steering assistance amount of the electronic power steering 3 in a case where the center of the vehicle V is determined to be traveling on the inner side of curve than the center of the lane V as compared to a case determined to be traveling on the outer side. In this way, the lane maintaining assistance device 1 can prevent the driver from rotating the steering wheel 5 excessively, and can prevent the vehicle V from deviating from the lane line on the inner side of the curve.

For example, the steering assistance control unit 83 determines whether the vehicle V is traveling at the center of the lane, traveling on the inner side of the curve than the center of the lane, or traveling on the outer side of the curve than the center of the lane, from positions of two lane lines appearing in the captured image. The steering assistance control unit 83, for example, determines that the vehicle V is traveling on the right side of the center of the lane when the lane line appears to the left in the captured image. The steering assistance control unit 83, for example, determines that the vehicle V is traveling on the left side of the center of the lane when the lane line appears to the right in the captured image.

The steering assistance control unit 83 may reduce the steering assistance amount of the electronic power steering 3 as the center V of the vehicle is closer to the inner side of the curve than the center of the lane. Specifically, for example, the steering assistance control unit 83 determines how much the vehicle V is traveling on the inner side or the outer side of the curve than the center of the lane on the basis of the position where the lane line appears in the captured image, and adjusts the steering assistance amount of the electronic power steering 3. In this way, when the vehicle V is on the inner side of the curve than the center of the lane, it is possible to prevent the driver from rotating the steering wheel 5 excessively. As a result, it is possible to prevent the vehicle V from deviating from the lane line on the curve inner side.

The steering assistance control unit 83 determines whether the steering wheel 5 is rotated in a direction turning to the inner side of the curve or rotated in a direction turning to the outer side of the curve on the basis of the rotation angle of the steering shaft 6 acquired from the steering angle sensor S and the captured image, maintains the steering assistance amount of the electronic power steering 3 when the steering wheel 5 is rotated in the direction turning to the inner side of the curve, and reduces the steering assistance amount of the electronic power steering 3 when the steering wheel 5 is rotated in the direction turning to the outer side of the curve.

In this way, the torque applied to the steering shaft 6 in the direction turning the steering wheel 5 toward the curve inner side is reduced, while the torque applied to the steering shaft 6 in the direction turning the steering wheel 5 to the curve outer side remains constant. As a result, the driver can be prevented from rotating the steering wheel 5 excessively, the vehicle V can be prevented from deviating from the lane line on the inner side of the curve, and the vehicle V can be easily returned to the center of the lane.

The steering assistance control unit 83 may reduce the steering assistance amount applied to the steering shaft 6 by the electronic power steering 3 when the vehicle V is traveling on the curve inner side than the center of the lane in a case where the curvature radius of the curve is small as compared to a case where the curvature radius of the curve is large.

When the curvature radius of the curve is small, that is, when the curve is steep, the driver tends to rotate the steering wheel 5 excessively in order to go round the curve. The steering assistance control unit 83 can prevent the vehicle V from deviating from the lane line on the inner side of the curve by reducing the steering assistance amount of the electronic power steering 3 as the curvature radius of the curve is smaller.

The steering assistance control unit 83 may end the electronic power steering 3 and perform steering assistance of the vehicle V only with the hydraulic power steering 4 again when detecting that the vehicle V has left the curve on the basis of the captured image. For example, after entering the curve, the steering assistance control unit 83 detects that the vehicle V has left the curve and ends the electronic power steering 3 when the distance from the center line of the captured image to the lane line becomes constant.

[Processing Performed by Lane Maintaining Assistance Device 1]

FIG. 4 is a flowchart of a processing performed by the lane maintaining assistance device 1. First, the steering assistance control unit 83 determines whether or not the vehicle V has entered the curve (S41). In a case where the vehicle V has not entered the curve (NO in S41), the lane maintaining assistance device 1 repeats the processing of S41 again. In a case where the vehicle V has entered the curve (YES in S41), the steering assistance control unit 83 reduces the steering assistance amount of the hydraulic power steering 4, and starts steering assistance performed by the electronic power steering 3 (S42).

Subsequently, in a case where the vehicle V is traveling on the inner side of the curve (YES in S43), the steering assistance control unit 83 reduces the steering assistance amount of the electronic power steering 3. In a case where the vehicle V is not traveling on the inner side of the curve (NO in S43), the lane maintaining assistance device 1 proceeds to S45. In a case where the vehicle V has left the curve (YES in S45), the lane maintaining assistance device 1 ends the processing. When the vehicle V has not left the curve (NO in S45), the lane maintaining assistance device 1 resumes the processing from S43.

[Effects Achieved by Lane Maintaining Assistance Device 1]

As described above, the lane maintaining assistance device 1 according to the embodiment includes the hydraulic power steering 4 that performs steering assistance of the vehicle V by a hydraulic pressure, and an electronic power steering 3 that performs steering assistance of the vehicle V by a motor. The lane maintaining assistance device 1 reduces the steering assistance amount of the hydraulic power steering 4 and starts steering assistance performed by the electronic power steering 3 in a case where the vehicle V is determined to have entered a curve on the basis of the captured image in which the lane forward in the advancing-direction of the vehicle V is captured.

Thereby, the vehicle V on which the lane maintaining assistance device 1 is mounted can apply torques of different magnitudes to the steering shaft 6 in a case where the steering wheel 5 is turned to the left and in a case where the steering wheel 5 is turned to the right.

In particular, even in a large-sized vehicle in which the hydraulic power steering 4 has to be adopted, by using the lane maintaining assistance device 1, torques of different magnitudes can be applied to the steering shaft 6 in a case where the steering wheel 5 is turned to the left and in a case where the steering wheel 5 is turned to the right.

Therefore, when the vehicle V is traveling on the curve inner side than the center of the lane, the lane maintaining assistance device 1 can apply torques of different magnitudes in the direction in which the vehicle V turns to the inner side of the curve and in the direction in which the vehicle V turns to the outer side of the curve. Therefore, the driver of the vehicle V can easily return the vehicle V to the center of the lane when the vehicle V travels on the curve and shifts from the center of the lane to the curve inner side.

Although the present disclosure has been described using embodiments, the technical scope of the present disclosure is not limited to the scope described in the above embodiment. It is apparent to those skilled in the art that various modifications or improvements may be added to the above embodiment. It is also apparent from description of the scope of claims that an embodiment with such alterations or improvements can be included in the technical scope of the present disclosure.

The present application is based on Japanese Patent Application No. 2016-152051 filed on Aug. 2, 2016, contents of which are incorporated herein as reference.

INDUSTRIAL APPLICABILITY

The present disclosure has an effect of reducing application of a torque in a direction turning to an inner side of a curve while maintaining a torque applied in a direction turning to an outer side of the curve in a vehicle equipped with hydraulic power steering, and is useful in a lane maintaining assistance device, a lane maintaining assistance method, etc.

REFERENCE SIGNS LIST

V . . . Vehicle
S . . . Steering angle sensor
E . . . Engine
1 . . . Lane maintaining assistance device
2 . . . Camera
3 . . . Electronic power steering
4 . . . Hydraulic power steering
5 . . . Steering wheel
6 . . . Steering shaft
7 . . . Storage unit
8 . . . Control unit
81 . . . Lane center detection unit
82 . . . Curvature radius calculation unit
83 . . . Steering assistance control unit
9 . . . Motor 10 ... Electromagnetic valve
11 ... Variable displacement pump

The invention claimed is:

1. A lane maintaining assistance device comprising:
a first assistance device configured to perform steering assistance of a vehicle by a hydraulic pressure;
a second assistance device configured to perform steering assistance of the vehicle by a motor;
a steering angle sensor attached to a steering shaft of a steering wheel, the steering angle sensor being configured to detect a rotation angle of the steering shaft; and
a processor configured to, in a case when the vehicle is determined to have entered a curve on the basis of a captured image in which a lane forward in a vehicle advancing-direction is captured, reduce a steering assistance amount of the first assistance device and start steering assistance by the second assistance device;
detect a center of the lane from the captured image;
determine whether the steering wheel is rotated in a direction turning to an inner side of the curve from the center of the lane or is rotated in a direction turning to an outer side of curve from the center of the lane from the rotation angle of the steering shaft acquired from the steering angle sensor and the captured image;
in response to the determination that the steering wheel is rotated in the direction turning to the outer side of curve than the center of the lane, maintain the steering assistance amount of the second assistance device; and
in response to the determination that the steering wheel is rotated in the direction turning to the inner side of the curve than the center of the lane, reduce the steering assistance amount of the second assistance device.

2. The lane maintaining assistance device according to claim 1, wherein the processor is further configured to:
in a case when a center of the vehicle is determined to be traveling on an inner side of the curve than the center of the lane, reduce the steering assistance amount of the second assistance device as compared to a case where the center of the vehicle is determined to be traveling on the outer side of the curve than the center of the lane.

3. The lane maintaining assistance device according to claim 2, wherein the processor is configured to reduce the steering assistance amount of the second assistance device as the center of the vehicle is closer to the inner side of the curve than the center of the lane.

4. The lane maintaining assistance device according to claim 2, wherein the processor is further configured to:
calculate a curvature radius of the curve from the captured image; and
reduce the steering assistance amount of the second assistance device as the curvature radius of the curve is smaller.

5. The lane maintaining assistance device according to claim 1, wherein the processor is configured to:
in a case when the vehicle is determined to have not entered the curve, control the first assistance device so as to apply a first steering assistance amount to the steering shaft;
in a case when the vehicle is determined to have entered the curve,
control the first assistance device to apply a second steering assistance amount smaller than the first steering assistance amount to the steering shaft; and
control the second assistance device to apply a third steering assistance amount smaller than the second steering assistance amount to the steering shaft; and
in a case when the vehicle is determined to be traveling on the inner side of the curve and the steering wheel is determined to be rotated in the direction turning to the inner side of the curve, reduce the third steering assistance amount such that a sum of the second steering assistance amount and the third steering assistance amount is smaller than the first steering assistance amount.

6. A lane maintaining assistance method for a vehicle comprising a processor and a steering angle sensor attached to a steering shaft of a steering wheel, the steering angle sensor being configured to detect a rotation angle of the steering shaft, the method causing the processor to perform:
performing a first steering assistance of the vehicle by a hydraulic pressure;
performing a second steering assistance of the vehicle by a motor;
in a case when the vehicle is determined to have entered a curve on the basis of a captured image in which a lane forward in a vehicle advancing-direction is captured, reducing a steering assistance amount of the first steering assistance performed by the hydraulic pressure and starting the second steering assistance performed by the motor;
detecting a center of the lane from the captured image;
determining whether the steering wheel is rotated in a direction turning to the inner side of the curve from the center of the lane or is rotated in a direction turning to the outer side of curve from the center of the lane from the rotation angle of the steering shaft acquired from the steering angle sensor and the captured image;
based on the determination that the steering wheel is rotated in the direction turning to the outer side of curve than the center of the lane, maintaining the steering assistance amount of the second steering assistance performed by the motor; and
based on the determination that the steering wheel is rotated in the direction turning to the inner side of the curve than the center of the lane, reducing the steering assistance amount of the second steering assistance performed by the motor.

7. The lane maintaining assistance method according to claim 6, wherein the method further causes the processor to perform:
in a case when a center of the vehicle is determined to be traveling on an inner side of curve than the center of the lane, reducing the steering assistance amount of the second steering assistance performed by the motor as compared to a case where the center of the vehicle is determined to be traveling on the outer side of the curve than the center of the lane.

8. The lane maintaining assistance method according to claim 7, wherein the reducing of the steering assistance amount of the second steering assistance performed by the motor is performed as the center of the vehicle is closer to the inner side of the curve than the center of the lane.

9. The lane maintaining assistance method according to claim 7,
wherein the method further causes the processor to perform:
calculating a curvature radius of the curve from the captured image, and wherein the reducing of the steering assistance amount of the second steering assistance performed by the motor is performed as the curvature radius of the curve is smaller.

10. The lane maintaining assistance method according to claim 6, wherein the method further causes the processor to perform:
   in a case when the vehicle is determined to have not entered the curve, applying a first steering assistance amount to the steering shaft by the hydraulic pressure;
   in a case when the vehicle is determined to have entered the curve,
   applying a second steering assistance amount smaller than the first steering assistance amount to the steering shaft by the hydraulic pressure; and
   applying a third steering assistance amount smaller than the second steering assistance amount to the steering shaft by the motor; and
   in a case when the vehicle is determined to be traveling on the inner side of the curve and the steering wheel is determined to be rotated in the direction turning to the inner side of the curve, reducing the third steering assistance amount such that a sum of the second steering assistance amount and the third steering assistance amount is smaller than the first steering assistance amount.

11. The lane maintaining assistance device according to claim 1, wherein the processor is further configured to:
   acquire the rotation angle of the steering shaft from the steering angle sensor, and
   determine whether the steering wheel is rotated clockwise or counterclockwise,
   wherein the determination of whether the steering wheel is rotated in the direction turning to the inner side of the curve from the center of the lane or is rotated in the direction turning to the outer side of curve from the center of the lane is based on the determination of whether the steering wheel is rotated clockwise or counterclockwise.

* * * * *